United States Patent
Parekh et al.

(10) Patent No.: US 7,058,163 B1
(45) Date of Patent: Jun. 6, 2006

(54) SYSTEM AND METHOD FOR EX POST FACTO PRESERVING A RECORDED CONVERSATION

(75) Inventors: Uday R. Parekh, Plano, TX (US); John Beck Mow, Dallas, TX (US); Danny C. Milliorn, Waxahachie, TX (US)

(73) Assignee: T-Netix, Inc., Carrollton, TX (US)

(*) Notice: Subject to any disclaimer, the term of this patent is extended or adjusted under 35 U.S.C. 154(b) by 953 days.

(21) Appl. No.: 09/596,298

(22) Filed: Jun. 17, 2000

(51) Int. Cl.
*H04M 1/64* (2006.01)

(52) U.S. Cl. .......... 379/85; 379/68; 379/88.22

(58) Field of Classification Search ......... 379/32.01, 379/32.02, 32.03, 32.04, 35, 67.1, 70, 85, 379/88.11, 88.22, 88.28, 202.01, 265.01–265.03, 379/68

See application file for complete search history.

(56) References Cited

U.S. PATENT DOCUMENTS

| | | | |
|---|---|---|---|
| 4,935,956 A | 6/1990 | Hellwarth et al. | 379/144.02 |
| 5,416,831 A | 5/1995 | Chewning, III et al. | 379/201.01 |
| 5,485,507 A | 1/1996 | Brown et al. | 379/88.08 |
| 5,495,522 A * | 2/1996 | Allen et al. | 379/202.01 |
| 5,524,141 A | 6/1996 | Braun et al. | 379/93.25 |
| 5,535,261 A | 7/1996 | Brown et al. | 379/88.11 |
| 5,805,685 A | 9/1998 | McFarlen | 379/189 |
| 5,862,519 A | 1/1999 | Sharma et al. | 704/231 |
| 5,923,746 A * | 7/1999 | Baker et al. | 379/265.02 |
| 6,064,732 A * | 5/2000 | Pezzullo et al. | 379/396 |
| 6,122,239 A * | 9/2000 | Bodo et al. | 369/32.01 |
| 6,542,602 B1 * | 4/2003 | Elazar | 379/265.06 |
| 6,553,183 B1 * | 4/2003 | Kataoka | 386/112 |
| 6,785,370 B1 * | 8/2004 | Glowny et al. | 379/88.22 |
| 2001/0038689 A1 * | 11/2001 | Liljestrand et al. | 379/201.03 |
| 2002/0071537 A1 * | 6/2002 | Gainsboro | 379/188 |
| 2002/0150232 A1 * | 10/2002 | Walker et al. | 379/266.01 |

FOREIGN PATENT DOCUMENTS

WO     WO 9839901 A1 * 9/1998

* cited by examiner

*Primary Examiner*—Ovidio Escalante
(74) *Attorney, Agent, or Firm*—Fulbright & Jaworski LLP

(57) ABSTRACT

For use with an automated call placement system (ACP) having a switching service unit (SSU), a call monitoring unit capable of monitoring a selected one of lines coupled to the switching service unit and a method of making a recording of a conversation occurring on a selected one of lines coupled to the switching service unit. In one embodiment, the system includes: (1) an analog or digital recorder, coupled to the call monitoring unit, that monitors a call carried on the selected one of the lines and creates a recording of the call on a storage medium associated therewith, the storage medium being of finite capacity thereby causing the recording to be subject to eventual overwriting and (2) a recorder controller, coupled to the recorder, that audibly reproduces the call to a user in real time and allows the user to preserve the recording to delay or prevent the overwriting.

20 Claims, 4 Drawing Sheets

SYSTEM AND METHOD FOR EX POST FACTO PRESERVING A RECORDED CONVERSATION

TECHNICAL FIELD OF THE INVENTION

The present invention is directed, in general, to automated call placement systems (ACPs) and, more specifically, to a system and method for ex post facto preserving a recorded conversation.

BACKGROUND OF THE INVENTION

Inmates at correctional facilities have begun to regard access to a telephone to be a valuable privilege. Years ago, correctional facilities (prisons, jails and the like) made a few telephones available at a central location. To ensure that the inmates said nothing inappropriate, correctional officers (or, more colloquially, "guards") stood by or listened on nearby telephones to inmate conversations.

Soon, however, correctional facilities began to install automated call placement systems (ACPs) with distributed telephones, perhaps with a telephone in each inmate's cell. Denied their convenient central location, correctional officers began to be required to monitor conversations more closely. Controls (such as individual access codes) began to be put into place to ensure that only inmates who had earned the privilege were allowed access to a telephone. Correctional officers began to use dedicated call monitoring telephones to monitor conversations.

ACPs then began to be fitted with recorders, so conversations could be stored and played back at will. The earliest recorders were multiple track tape recorders wherein each track was assigned to monitor each outbound trunk line. The recorders were placed into a continuous recording mode, so that all conversations were recorded. If a particular conversation or conversations were desired to be played back or archived, each conversation on each track was required to be scanned to find the right one(s).

More sophisticated call monitoring units eventually replaced tape recorders. These units employed disk storage in lieu of tape and stored conversations in digitized form on the disks. The correctional officer could then scan through the conversations taking place at a particular time, monitor a particular one of the conversations at length and search the call monitoring unit for the particular file containing the conversation in its entirety to allow him to hear the parts of the conversation he may have missed. Such a call monitoring unit is described in U.S. patent application Ser. No. 09/546.844, filed on Apr. 11, 2000, and entitled "System and Method for Remotely Controlling Automated Call Placement Call Monitoring Functions," commonly assigned with the present Application and incorporated herein in its entirety.

Unfortunately, even with highly advanced call monitoring units such as that described in the above-mentioned patent application, the finite amount of storage space available on the data storage disks requires the unit to erase (or, more accurately, record over) existing conversations to make room for newly recorded conversations. As a result, important conversations are increasingly at risk of being overwritten, as each day the unit records new conversations. Accordingly, what is needed in the art is a call monitoring unit, and related method of recording, capable of more safely storing recorded conversations. Further, what is needed in the art is an automated call placement system incorporating the call monitoring unit or the method.

SUMMARY OF THE INVENTION

To address the above-discussed deficiencies of the prior art, the present invention provides, for use with an automated call placement system (ACP) having a switching service unit, a call monitoring unit capable of monitoring a selected one of lines coupled to the switching service unit and a method of making a recording of a conversation occurring on a selected one of lines coupled to the switching service unit. In one embodiment, the system includes: (1) an analog or digital recorder, coupled to the call monitoring unit, that monitors a call carried on the selected one of the lines and creates a recording of the call on a storage medium (perhaps including disk storage) associated therewith, the storage medium being of finite capacity thereby causing the recording to be subject to eventual overwriting and (2) a recorder controller, coupled to the recorder, that audibly reproduces the call to a user in real time and allows the user to preserve the recording to delay (or, in some embodiments, completely prevent) the overwriting.

In one embodiment of the present invention, the storage medium contains a plurality of recordings arranged in directories according to a date on which the recorder created the plurality of recordings. In such embodiment, the recorder can employ aging (or other prioritization) to overwrite older (or lower priority) recordings and thereby recover space for storage of more recent (or higher priority) recordings. Of course, this can expose recordings to an ever-increasing risk of overwriting as they age (or diminish in priority). Accordingly, the present invention allows recordings to be designated to delay or prevent them from being overwritten. Of course, the plurality of recordings may be arranged in any other suitable manner (such as by extension number, inmate number, inmate gang identity or inmate language).

In one embodiment of the present invention, the recorder controller is an ADSI-capable device. Those skilled in the art are familiar with the ADSI standard and its use in effecting remote control of system functions in general. Although not necessary to the present invention, an ADSI-capable device may be employed to effect preservation of a recording from a location distal from the recorder.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
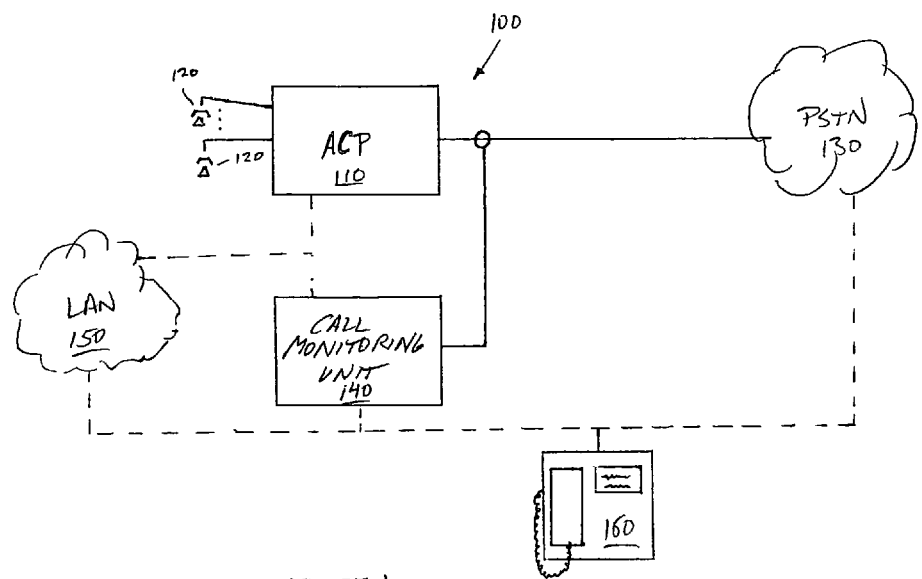
FIG. 1 illustrates a block diagram of an automated call placement system (ACP) having a switching service unit and a call monitoring unit that forms an environment within which the system or method of the present invention can be incorporated.

Referring initially to FIG. 1, illustrated is a block diagram of an automated call placement system (ACP), generally designated 100. The ACP 100 is illustrated as including a switching service unit (SSU) 110. The SSU 110 is designed to act as a hub, like a private branch exchange (PBX), comprising the SSU 110 and a plurality of stations 120. The SSU 110 acts to interconnect ones of the plurality of stations 120 with ones of a plurality of trunks (telephone lines for gaining access to the public switched telephone network, or PSTN, 130). The SSU 110 may be a conventional, commercially available SSU or any later-developed one capable of interconnecting stations with trunks. (Although only a few stations 120 are illustrated, those skilled in the pertinent art will understand that fewer or more can be supported.)

Though not an exclusive environment for the present invention, the illustrated embodiment of the ACP 100 is adapted for use in a correctional facility (not illustrated) to allow inmates (not illustrated) to place calls to without the facility. Each of the plurality of stations 120 preferably has a keypad for allowing an inmate to enter a code unique to each inmate or speech recognition capability to allow the inmate to speak the code. The code may be, for example, a publicly known inmate number, a private personal identification number (PIN) or a combination of the two. The inmate then provides a destination telephone number to be dialed. Having provided one or more codes and the destination number, the SSU 110 seizes an available trunk signals the PSTN 130 to initiate a call to the destination number and completes the call in a purely conventional (typically collect) manner. In the case of collect calling, the inmate's code may be verified before seizing a trunk. When the call is terminated (by the inmate, a called party or perhaps a correctional officer), the SSU 110 releases the station from which the inmate placed the call and the trunk involved.

The SSU 110 may be capable of receiving inbound calls from the PSTN 130 destined for one of the plurality of stations 120 or completing intra-PBX calls from one of the plurality of stations 120 to another. However, correctional facilities routinely disable these capabilities on the theory that the public should not be allowed direct access to inmates and that intra-PBX calling may further inmate conspiracies. (Some facilities do allow attorneys to place inbound calls by means of special dialing codes.)

As described above, it is important in some environments to monitor, and perhaps record, the conversations that take place on the plurality of stations 120. In the context of a correctional facility, inmate conversations should be monitored for purposes of security. In other environments, policy compliance or quality control may be of concern. Accordingly, the ACP 100 is illustrated as including a call monitoring unit 140. The structure and function of the call monitoring unit 140 will be set forth in greater detail in conjunction with FIG. 3.

Broadly speaking, the call monitoring unit 140 monitors (taps), and perhaps records, conversations taking place between the plurality of stations 120 and the PSTN 130. The call monitoring unit 140 does this by tapping either trunks or station lines (FIG. 1 illustrates the former), recording one or both sides or the conversation. While the call monitoring unit 140 may simply monitor each trunk or station continuously (requiring one channel per trunk or station), the illustrated call monitoring unit 140 detects when trunks or stations are active, and then selects a channel for that trunk or station.

The call monitoring unit 140 may be analog, but is digital in the illustrated embodiment. Accordingly, the call monitoring unit 140 may take the form of a software-programmed general-purpose computer with telephony interface cards, such as those commercially available from Dialogic Corporation of Parsippany, N.J., a subsidiary of Intel Incorporated. The call monitoring unit 140 is illustrated as optionally being connected directly to the SSU 110 (depicted in FIG. 1 by a broken line directly spanning the call monitoring unit 140 and the SSU 110). Though not required, a connection between the call monitoring unit 140 and the SSU 110 allows the call monitoring unit 140 to receive data from the SSU 110 regarding calls to be placed through the SSU 110. Were the connection not to be available, the call monitoring unit 140 would be required to detect calls and associated data (such as destination number) from its trunk or station tap.

FIG. 1 further illustrates a local area network (LAN) 150 that may optionally couple the call monitoring unit 140 to the SSU 110 (depicted in FIG. 1 by a broken line spanning the call monitoring unit 140 and the SSU 110).

Many currently commercially available SSUs come with LAN interfaces or data communication ports (e.g., at least one serial or parallel port). Likewise, since the call monitoring unit 140 is illustrated as being embodied in a computer system, the call monitoring unit 140 can be provided with a conventional LAN interface or data communication port (typically taking the form of an adapter card). Thus coupled via the interface or port, the call monitoring unit 140 and the SSU 110 can be physically separated from one another, and other devices, such as controllers (not shown) for the ACP as a whole can be made to interact with the call monitoring unit 140 or the SSU 110.

It should be noted that the call monitoring unit 140 may be physically separate from, or integrated with, the SSU 110. The present invention can work with either configuration.

FIG. 1 finally shows an in-band data-capable device 160 that takes the form of an Analog Display Services Interface (ADSI)-capable telephone in the illustrated embodiment. ADSI is a telecommunications protocol standard published by Bellcore in December, 1993 (Analog Display Services Interface (ADSI) SPCS/Server Generic Requirements, GR-1273-CORE, Issue 1, July 1998), and incorporated herein by reference. ADSI enables alternate voice and data capability over the existing analog telephone network, in which single wire pairs couple stations together; separate wire pairs are not available for signaling or data transfer between the stations. The present invention makes advantageous use of ADSI, or other conventional or later-developed single-wire-pair protocols, to allow the device 160 to control the call monitoring unit 140 through only a single wire pair. This yields substantial flexibility in terms of device 160 location and installation cost, particularly in difficult environments, such as correctional facilities.

The device 160 is shown as being couplable to the call monitoring unit 140 in a number of optional ways. First, the device 160 may be coupled directly to the call monitoring unit 140. (In such case, the call monitoring unit is provided with an ADSI-capable interface.) Second, the device 160 may be coupled to the call monitoring unit 140 via the LAN 150. (In such case, ADSI-encapsulated information and commands are further encapsulated during their transmission over the LAN 150.) Third, the device 160 may serve as a station in the PBX, and therefore be coupled to the call monitoring unit 140 through the SSU 110. Fourth, the device 160 may be coupled to the call monitoring unit 140 via the PSTN 130. This would allow the device to be located in any place in the world that is reachable by telephone. Finally, the device 160 may be wirelessly coupled to the call monitoring unit 140 directly or via any of the other above-described intermediaries (LAN 150, SSU 110 or PSTN 130). In such case, though the device 160 may no longer communicate through a single wire pair, it nonetheless remains capable of communicating with and controlling the call monitoring unit 140 without requiring wireless bandwidth exceeding that required for voice communication.

Figure 2:
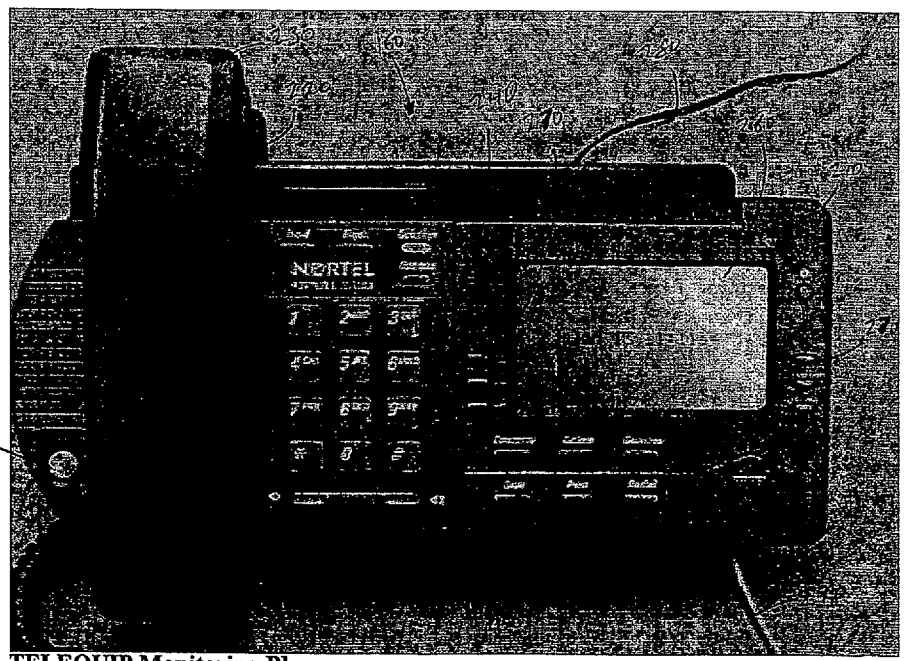
FIG. 2 illustrates an in-band data-capable device having a display and coupled via a single wire pair or other similar interface to the call monitoring unit of FIG. 1.

Turning now to FIG. 2, illustrated is the in-band data-capable device 160 of FIG. 1, which is conventional in all respects, except that it can be programmed according to the principles of the present invention to control a call monitoring unit. The device 160 is illustrated as having a body 210 in which a cradle 220 is formed, a handset 230 disposed within the cradle 220 and having a microphone and speaker (not separately referenced) located therein, a keypad 240, dedicated buttons 250 that control functions of the device 160 and a display 260 that takes the form of an LCD.

The display 260 is adapted to show a plurality of lines of alphanumeric text and special characters, with a given number of characters per line. In the illustrated embodiment, the display 260 is capable of displaying seven lines, with 24 characters per line.

Located adjacent and to each side of the display 260 are a plurality of software-configurable, or "soft" buttons 270. The soft buttons correspond to specific lines on the display 260, such that characters may be displayed on the display 260 that correspond to particular soft buttons 270.

The device 160 receives user traffic through a conventional single wire pair interface (not illustrated) and a single wire pair 280 and reproduces the traffic on the speaker of the handset 230. The device 160 further receives user traffic through the microphone of the handset 230 and transmits the traffic through the single wire pair. The device 160 receives ADSI-encapsulated information from the call monitoring unit 140 of FIG. 1 and displays the ADSI-encapsulated information on the display 260. The device 160 may also generate ADSI-encapsulated commands (usually in response to depression of one of the soft buttons 270) intended to control the call monitoring unit 140 of FIG. 1. The device 160 transmits these ADSI-encapsulated commands over the single wire pair 280 to the call monitoring unit 140.

In the illustrated embodiment of the present invention, the device 160 receives electrical power through a separate power line 290 or battery. Most currently available ADSI-capable devices are unable to draw sufficient current from the single wire pair 280 to power the display 260. Thus, they employ the separate power line 290 or supply.

Those skilled in the pertinent art will understand that the device 160 may assume alternative embodiments. For example, a multimedia personal computer may be programmed to reproduce user traffic on a speaker thereof, accept and display ADSI-encapsulated information and provide ADSI-encapsulated commands. An ADSI unit having a display and soft buttons may also augment a non-ADSI telephone to yield a suitable device 160.

Figure 3:
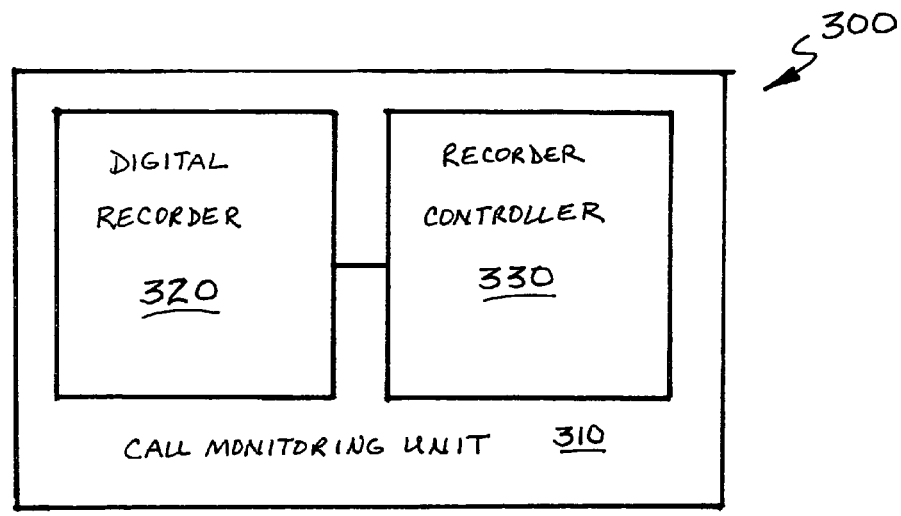
FIG. 3 illustrates a block diagram of a system for ex post facto preserving a recorded conversation constructed according to the principles of the present invention.

Turning now to FIG. 3, illustrated is a block diagram of a system 300 for ex post facto preserving a recorded conversation constructed according to the principles of the present invention. The system 300 includes a call monitoring unit 310. The call monitoring unit 310 includes a digital recorder 320 and recorder controller 330.

Although FIG. 3 illustrates the digital recorder 320, the present invention is not so limited, and is broad enough to encompass analog recorders. The digital recorder 320 is coupled to the call monitoring unit 310, and is employed when the user monitors a call carried on a selected telephone line (not illustrated). The function of the digital recorder 320 will be described in greater detail with respect to FIG. 4.

The recorder controller 330 is coupled to the digital recorder 320 and audibly reproduces the call to a user in real time. In addition, the recorder controller 330 allows the user to preserve a recording to delay (or, in some embodiments, completely prevent) its overwriting. In FIG. 3, the recorder controller 330 is illustrated as an ADSI-capable device. Those skilled in the art are familiar with the ADSI standard and its use in effecting remote control of system functions in general. Although not necessary to the present invention, an ADSI-capable recorder controller 330 may be employed to effect preservation of a recording, in accordance with the principles of the present invention, from a location distal from the digital recorder 320.

Figure 4:
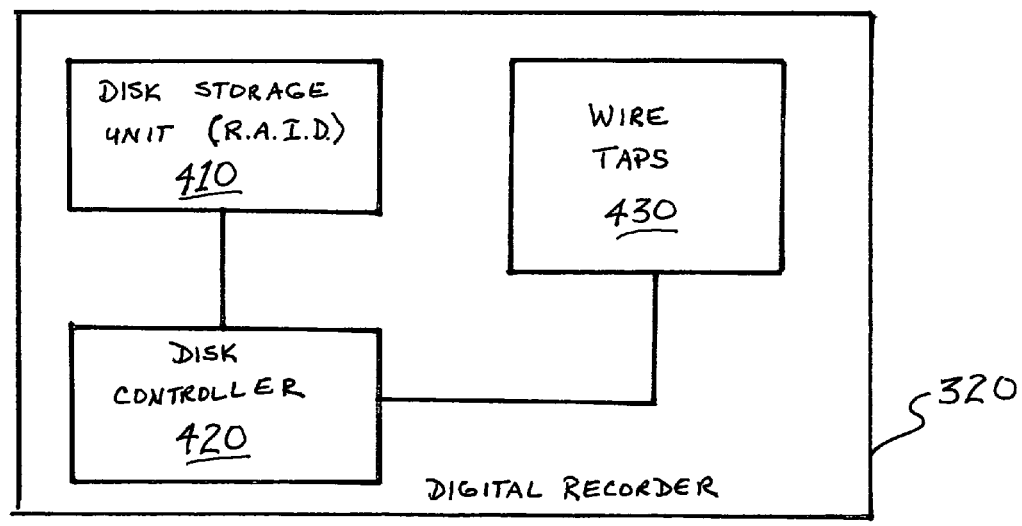
FIG. 4 illustrates a block diagram of the digital recorder of FIG. 3 that may be used with the ACP of FIG. 1 and the system of FIG. 3.

Turning now to FIG. 4, illustrated is a block diagram of the digital recorder 320 of FIG. 3 that may be used with the ACP 100 of FIG. 1 and the system 300 of FIG. 3. The digital recorder 320 includes a disk storage unit 410 for storing recorded conversations. The digital recorder 320 further includes a disk controller 420, coupled to the disk storage unit 410, for controlling the manner in which recorded conversations are stored and erased on the disk storage unit 410. The digital recorder 320 still further includes a set of wire taps 430. The wire taps 430 represent telephone lines monitored by the user, and possibly marked for recording by the recorder controller 330.

The disk storage unit 410 is illustrated having a Redundant Array of Inexpensive Disks ("RAID") architecture. Those skilled in the art are familiar with the RAID architecture and the advantages associated therewith. Of course, the present invention is not limited to RAID architecture and is broad enough to encompass a wide array of storage device architectures. The disk storage unit 410 is also of a type having a finite storage capacity. As a result, a recorded conversation stored in the disk storage unit 410 is subject to eventual overwriting when the disk storage unit 410 reaches full capacity.

The digital recorder 320 functions as follows. A conversation, monitored from a select wire tap within the set of wire taps 430, is designated for recording and storage. The disk controller 420 controls the location within the disk storage unit 410 where the recording is stored until needed. The disk storage unit 410 of FIG. 4 can contain a plurality of recordings arranged in directories according to the date on which the digital recorder 320 created the plurality of recordings, or other basis of priority. In this case, the digital recorder 320 can employ aging or other basis of priority to erase older or lower priority recordings and thereby recover space for storage of more recent or higher priority recordings. Of course, this can expose older recordings that are still higher priority than more recent recordings to an ever-increasing risk of overwriting as they age.

Accordingly, the present invention allows recordings to be designated to delay or prevent them from being overwritten. Specifically, the user employs the recorder controller 330 of FIG. 3 to prevent the digital recorder 320 from storing a more recent but lower priority conversation over a specific older but higher priority conversation. Thus, the user can eliminate the risk that important conversations will be overwritten by conversations of lower priority by ensuring the more recent lower priority conversations are only stored over older recordings that are even lower priority and no longer needed. In addition, the user can prevent such an overwriting at any time while monitoring the conversation, or even after the conversation has ended. By allowing such an "ex post facto" preservation, the user can begin monitoring a conversation after it has started, but still, after recognizing the importance of the conversation, prevent its overwriting until the entire conversation can be reviewed from start to finish at a later time.

Figure 5:
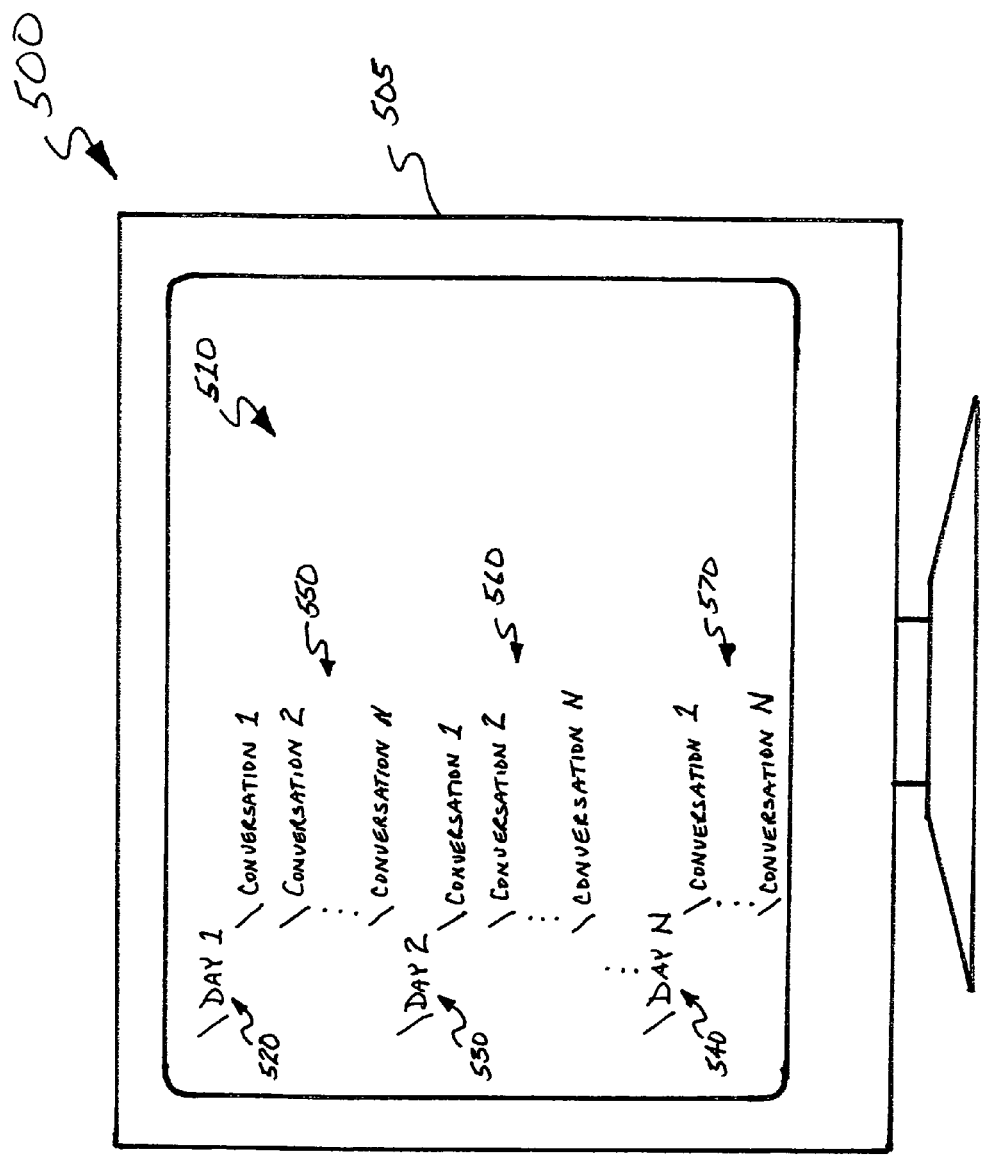
FIG. 5 illustrates a file structure suitable for storing recordings produced by the digital recorder of FIG. 4.

Turning now to FIG. 5, illustrated is a diagram 500 of a file structure 510 suitable for storing recordings produced by the digital recorder 320 of FIG. 4. The diagram 500 further includes a computer monitor 505 by which the file structure 510 is displayed for the user.

The file structure 510 includes first, second and third directories 520, 530, 540. The first directory 520 includes a first set of files 550, and represents the first day on which stored conversations occurred ("Day 1"). Each file within the first set of files 550 represents individual conversations stored in the disk storage unit 410 ("Conversation 1" through "Conversation N") that occurred on Day 1. The second directory 530 includes a second set of files 560, and represents the second day on which stored conversations occurred ("Day 2"). Each file within the second set of files 560 represents individual conversations stored in the disk storage unit 410 ("Conversation 1" through "Conversation N") that occurred on Day 2. The third directory 540 includes a third set of files 570, and represents any day that conversations occurred that is more recent than the first or second day ("Day N"). Each file within the third set of files 570 represents individual conversations ("Conversation 1" through "Conversation N") more recent than those that occurred on Day 1 or Day 2.

In the illustrated embodiment, the file structure 510 represents the format by which the disk controller 420 stored recorded conversations on the disk storage unit 410. Specifically, the file structure 510 represents a plurality of recordings arranged in directories 520, 530, 540 according to the date on which the digital recorder 320 created the plurality of recordings. As discussed before, the digital recorder 320 thus employs aging to erase older recordings and thereby recover space for storage of more recent recordings. Because this can expose recordings to an increasing risk of overwriting as they age, the present invention allows the user to prevent the digital recorder 320 from storing a more recent conversation over a specific older conversation. Also as before, this preservation can occur even if the user began monitoring the conversation after its inception. Although the illustrated file structure 510 represents a plurality of recordings arranged according to their date, the present invention is broad enough to encompass a file structure based on other characteristics of the recordings.

Figure 6:
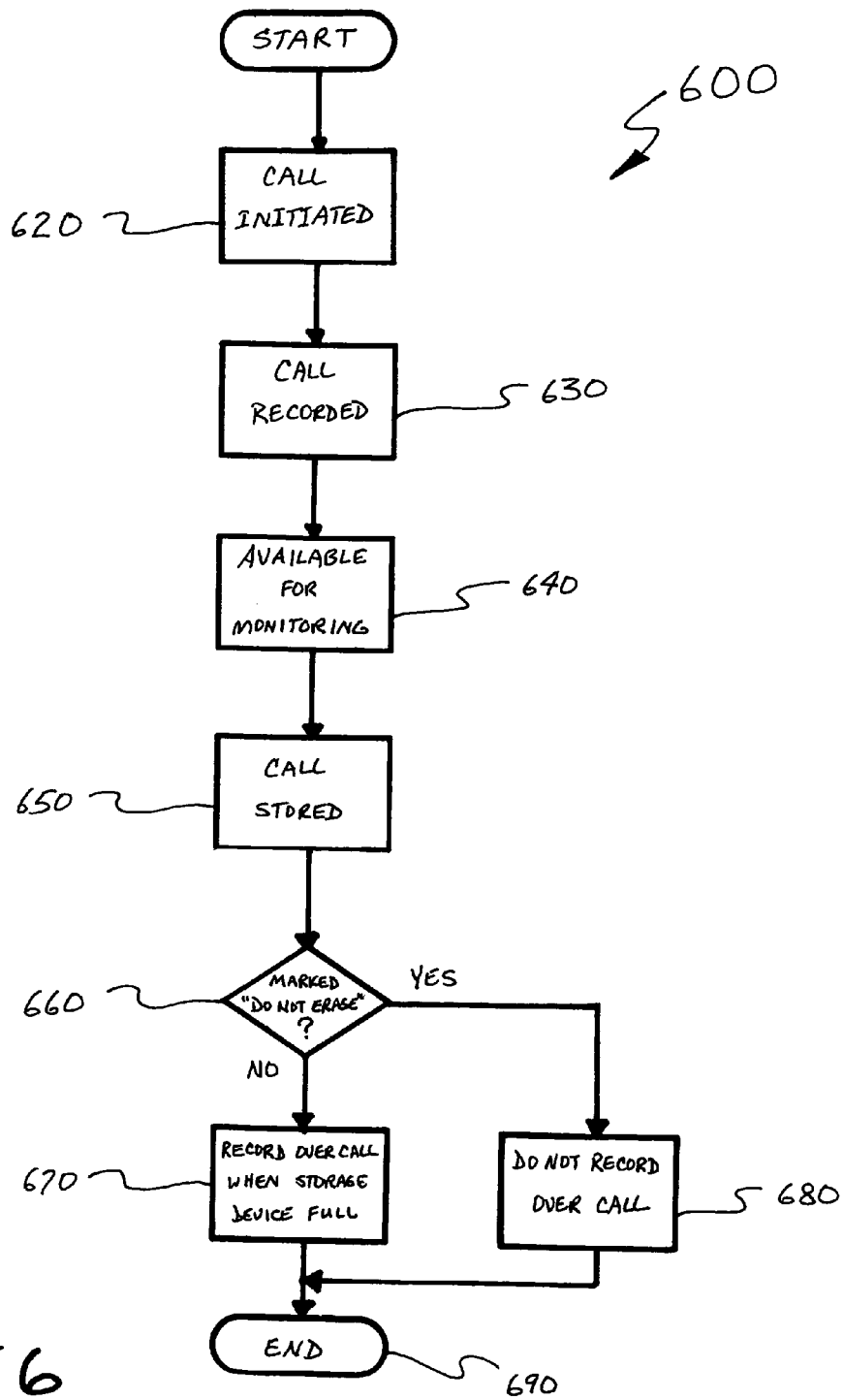
FIG. 6 illustrates a flow diagram of a method of ex post facto preserving a recorded conversation carried out according to the principles of the present invention.

Turning now to FIG. 6, illustrated is a flow diagram 600 of a method of ex post facto preserving a recorded conversation carried out according to the principles of the present invention. The flow diagram 600 begins in a start step 610.

An inmate in a correctional facility, or other similarly monitored person, initiates a telephone call in a step 620. The call is recorded for future playback in a step 630. Recording of the call can be predetermined to take place immediately when the call is placed, or simply when the person monitoring the call elects to record the call. Of course, the present invention is broad enough to encompass any such system.

In a step 640, the call is available for monitoring by the user. While monitoring is not required for the present invention, if the user elects to monitor the call monitoring occurs in real time. The call is then stored in a data storage device in a step 650. The data storage device may be in a RAID format, however the present invention is not so limited. Those skilled in the art understand the advantages of the RAID format. The data storage device is of a finite capacity, thus at some point the storage capacity of the device becomes full. When its capacity becomes full, newly recorded calls must be recorded in place of calls already stored in the data storage device. The overwriting usually occurs based on the age of the existing calls stored on the device, but other formats are within the broad scope of the present invention.

In a step 660, it is determined whether the user has indicated that the current monitored call is to be prevented from overwriting. In this step 660, the user can mark the current call as such even if real time monitoring began after the call was initiated. In addition, the user can elect to prevent the overwriting of any call stored in the data storage device, even if that call has already terminated. If the user has not indicated that the current call is to be prevented from overwriting, the data storage device may store a later call over the current call in a step 670.

However, if the user has designated the current call is to be prevented from overwriting, the data storage device is prevented from storing a later call over the current call in a step 680. As discussed above, this feature of the present invention allows the user to ensure the current call is not overwritten with a new call should the data storage device become full. Finally, the flow diagram 600 ends in a step 690.

Although the present invention has been described in detail, those skilled in the art should understand that they can make various changes, substitutions and alterations herein without departing from the spirit and scope of the invention in its broadest form.

What is claimed is:

1. For use with an automated call placement system having a switching service unit, a call monitoring unit capable of monitoring a selected one of lines coupled to said switching service unit, comprising:
   a recorder, coupled to said call monitoring unit, that monitors a call carried on said selected one of said lines and creates a recording of said call on a storage medium associated therewith, said storage medium being of mite capacity thereby causing said recording to be subject to eventual overwriting from a subsequent call; and
   a recorder controller, coupled to said recorder, that provides an audible reproduction of said call to a user in real time and allows said user to preserve said recording based on said audible reproduction to delay said overwriting from said subsequent call.

2. The system as recited in claim 1 wherein said recorder controller allows said user to preserve said recording to prevent said overwriting.

3. The system as recited in claim 1 wherein said recorder monitors said call by tapping a trunk line coupled to said switching service unit.

4. The system as recited in claim 1 wherein said call is an outgoing call from a station coupled to said switching service unit.

5. The system as recited in claim 1 wherein said storage medium contains a plurality of recordings arranged in directories according to a date on which said recorder created said plurality of recordings.

6. The system as recited in claim 1 wherein said recorder controller is an ADSI-capable device.

7. The system as recited in claim 1 wherein said recording is subject to overwriting on an aged basis.

8. For use with an automated call placement system having a switching service unit, a method of making a recording of a conversation occurring on a selected one of lines coupled to said switching service unit, comprising:
   monitoring a call carried on said selected one of said lines;
   creating a recording of said call on a storage medium, said storage medium being of finite capacity thereby causing said recording to be subject to eventual overwriting by a subsequent call; and
   providing an audible reproduction of said call to a user in real time with a recorder controller; and
   allowing said user, with said recorder controller, to preserve said recording based on said audible reproduction to delay said overwriting by said subsequent call.

9. The method as recited in claim 8 wherein said recorder controller allows said user to preserve said recording to prevent said overwriting.

10. The method as recited in claim 8 wherein said monitoring includes monitoring at a trunk line coupled to said switching service unit.

11. The method as recited in claim 8 wherein said call is an outgoing call from a station coupled to said switching service unit.

12. The method as recited in claim 8 wherein said storage medium contains a plurality of recordings arranged in directories according to a date on which said recorder created said plurality of recordings.

13. The method as recited in claim 8 wherein said recorder controller is an ADSI-capable device.

14. The method as recited in claim 8 wherein said recording is subject to overwriting on an aged basis.

15. An automated call placement system (ACP), comprising:
   a switching service unit;
   a plurality of stations coupled to said switching service unit;
   a call monitoring unit capable of monitoring a selected one of lines coupled to said switching service unit;
   a storage medium associated with said call monitoring unit;
   a recorder, coupled to said call monitoring unit, that monitors a call carried on said selected one of said lines and creates a recording of said call on a storage medium, said storage medium being of finite capacity thereby causing said recording to be subject to eventual overwriting by a subsequent call; and
   a recorder controller, coupled to said recorder, that provides an audible reproduction of said call to a user in real time and allows said user to preserve said recording based on said audible reproduction to prevent said overwriting by said subsequent call.

16. The ACP as recited in claim 15 wherein said recorder monitors said call by tapping a trunk line coupled to said switching service unit.

17. The ACP as recited in claim 15 wherein said call is an outgoing call from one of said plurality of stations.

18. The ACP as recited in claim 15 wherein said storage medium contains a plurality of recordings arranged in directories according to a date on which said recorder created said plurality of recordings.

19. The ACP as recited in claim 15 wherein said recorder controller is an ADSI-capable device.

20. The ACP as recited in claim 15 wherein said recording is subject to overwriting on an aged basis.

* * * * *